Feb. 10, 1959
B. M. MAYFIELD
2,872,751
LINE GUIDE FOR FISHING RODS
Filed Feb. 4, 1955
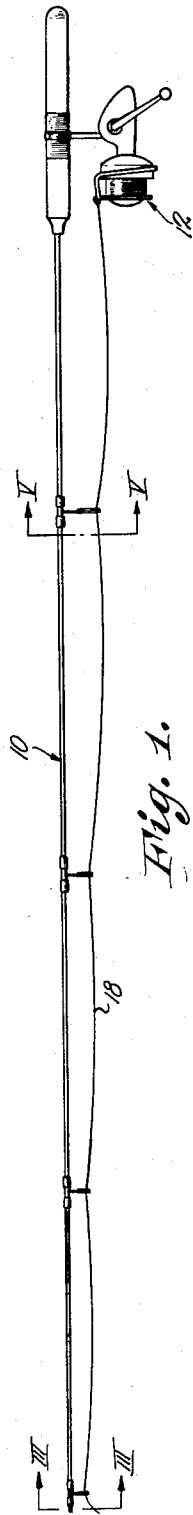
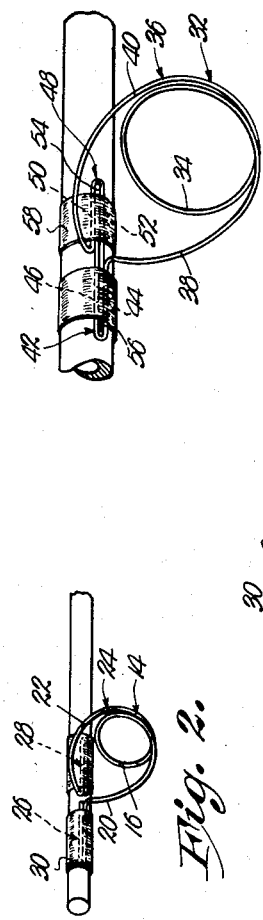
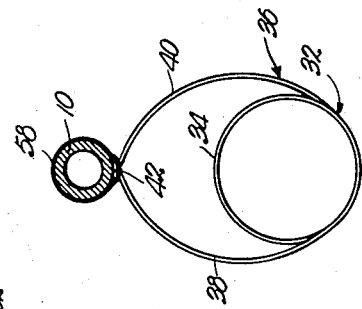
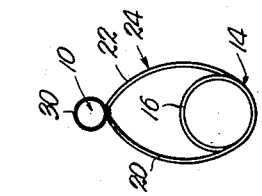
INVENTOR.
Burleigh M. Mayfield
BY
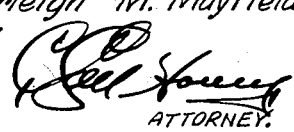
ATTORNEY.

United States Patent Office 2,872,751
Patented Feb. 10, 1959

2,872,751

LINE GUIDE FOR FISHING RODS

Burleigh M. Mayfield, Kansas City, Mo.

Application February 4, 1955, Serial No. 486,115

10 Claims. (Cl. 43—24)

This invention relates to improvements in fishing equipment and particularly to a novel line guide for fishing rods, the primary object being to eliminate the many objections to articles of this nature heretofore disclosed and/or marketed and to adapt the same for use with virtually any type of rod or reel.

It is the most important object of this invention to provide a guide that is exceedingly resistant to damage not only during use, but during packing, storage, shipment or handling prior to, and after the rod is actually placed in use.

Another important object of this invention is to provide a line guide having the aforesaid characteristics of strength and durability, yet be considerably lighter in weight than conventional guides, whereby the action of the rod itself is not impaired and the maneuverability or "feel" thereof is actually improved upon.

A further object of this invention is the provision of a line guide so made as to permit fastening of the same to the rod in conventional ways without adversely effecting the flexibility of the rod in any way, all contrary to the nature of guides heretofore conceived.

Still further, it is an extremely important object of this invention to provide a line guide that is especially adapted for use with spinning reels by virtue of the fact that it is capable of gradually and progressively taking out the spin or whirl in the line as it emanates from the reel, thereby preventing "pile-up" of the line as it attempts to pass through the eyes of the guides.

Another important object of this invention is to provide a line guide that eliminates "line slap" upon the rod which not only damages the line and the rod, but tears the wrappings which are utilized for attaching the guide to the rod.

Other objects include the provision of a line guide that is inexpensive to manufacture, easy to apply to the rod, long-lasting, attractive, trouble-free, easy to produce, and adapted to be made from readily available materials.

More minor objects include important details of construction all of which will be made clear or become apparent as the following specification progresses, reference being had to the accompanying drawing, wherein:

Figure 1 is an elevational view of a rod and reel showing a line guide made pursuant to the present invention operably mounted thereon.

Fig. 2 is a fragmentary, perspective view of the rod showing one of the line guides of the instant invention.

Fig. 3 is a cross-sectional view taken on line III—III of Fig. 1 showing the guide illustrated by Fig. 2.

Fig. 4 is a perspective view similar to Fig. 2 illustrating a slightly modified form of guide; and Fig. 5 is a cross-sectional view taken on line V—V of Fig. 1 illustrating the guide shown by Fig. 4.

It is to be understood at the outset, that fishing rod 10 and spinning reel 12, have been chosen in Fig. 1 to exemplify the principles of the instant invention solely because of the fact that the advantages of the line guides shown in Figs. 2 and 4 are especially favorable to improvement upon the operation of spinning reels. However, the guides may also be used to advantage in connection with fly rods, casting reels, salt water rods and the like, as will hereinafter become apparent.

The line guide illustrated in Figs. 2 and 3 of the drawing is broadly designated by the numeral 14 and is preferably made from a single length of lightweight, strong spring steel which may be similar to the wire that is conventionally used to produce lightweight springs. Such material or its equivalent is recommended to avoid breakage as the guide is submitted to bending, twisting and crushing actions. Heretofore line guides have been produced from soft, bendable material which is incapable of re-conforming to its initial shape and materials that break under constant bending at a given point as is true of ordinary wire. Cold-rolled, unhardened music wire that is compressed under pressure has been found to be quite suitable.

The single length of spring wire from which guide 14 is made is bent midway of the ends thereof into a single convolution of a spiral coil presenting a preferably circular eye 16 for receiving line 18 which emanates from the reel 12.

A pair of opposed, outwardly bowed legs 20 and 22 extending from the eye 16, present an ovoidal loop 24 that is substantially within the plane of the eye 16. The eye 16 is disposed within the loop 24 at the large end thereof and the ends of the legs 20 and 22 terminate in relatively close juxtaposition at the small end of the egg-shaped loop 24.

Legs 20 and 22 are provided with laterally extending feet 26 and 28 respectively, that are not only perpendicular to the legs 20 and 22 but substantially parallel with the axis of the eye 16. Feet 26 and 28 are aligned and extend in opposite directions from the common plane of loop 24 and eye 16 and are perpendicular to such plane. As best seen in Fig. 2, the ends of the single length of spring wire are rebent upon themselves to present a pair of stretches forming each foot 26 and 28 respectively. Feet 26 and 28 bear directly upon the rod 10 in parallelism with the longitudinal axis of the latter when the guide 14 is attached to the rod 10 through use of conventional wrappings 30 that bind the feet 26 and 28 in place.

Guide 32 is of essentially the same character in that it includes an eye 34 and a loop 36 made up of legs 38 and 40. Foot 42 integral with the leg 38 is rebent upon itself to present a pair of side-by-side stretches 44 and 46, and foot 48 integral with the leg 40 is similarly rebent upon itself to present a pair of stretches 50 and 52. However, the guide 32 differs from the guide 14 in that the stretch 46 of the foot 42 continues into an extension 54 that is disposed between the stretches 50 and 52 and the stretch 52 continues into an extension 56 that is disposed between the stretches 44 and 46 of foot 42. The means of attachment 58 for the guides 32 are wrapped around all three parts of the feet 42 and 48 as is clearly shown in Fig. 4 of the drawing.

The rod 10 is shown equipped with four guides, the two largest of which are made as shown in Figs. 4 and 5 and the two smaller guides 14 being according to the principles illustrated in Figs. 2 and 3. However, here again, it is to be appreciated that all of the guides on rod 10 may be of either type. The extensions 54 and 56 provide that added strength which may be desirable for the larger guides 32.

The diameters of the eyes 16 and 34 progressively increase uniformly as the reel 12 is approached and the distances between the eyes and the rod 10 progressively increase as the reel 12 is approached. It may be stated that under many circumstances it is to be preferred that each eye be spaced from the rod a distance at least equal to its diameter as seen in Fig. 3, but such distance may be decreased under certain conditions as shown in Fig. 5. In any event, it is possible through use of a guide of this character, to maintain the line 18 a greater distance away from the rod 10 than has been possible through use of conventional guides.

In spinning reels particularly, the line 18 unwinds from the reel 12 at a high rate of speed and in a coiled, whirling condition. Ordinarily this produces a "slap" against the rod 10 which damages the same and in a short time tears away the wrappings 30 and 58. However, when the guides of the instant invention are placed in use, the line whirls in engagement with the eyes 16 and 34 throughout the lengths of the latter and because of the increased distances between the eyes and the rod, there is no damaging slap of the line thereagainst.

Furthermore, the whirl or twist in the line as it emanates from the reel 12, is taken out or tamed down gradually and progressively, eliminating entirely the "pile up" of the line at the first or largest guide 32 which is commonly experienced when conventional guides are utilized.

Through the construction hereinabove described and the arrangement of the guides on the rod 10, such whirl or twist is virtually taken out in its entirety before the line passes through the last guide 14 at the tip end of the rod 10.

The improved line guide of the instant invention is exceedingly strong as above set forth. This feature results in part from the novel foot structure that is provided for attaching the guide to the rod. The guide can be bent fore and aft an indefinite number of times without any breakage at the point of juncture between the legs of the loops 24 and 36 and the corresponding feet.

The guides can be bent or twisted laterally, i. e., in a direction about the longitudinal axis of the rod 10 without damage or without breaking the guide loose from its mounting. In such bending or twisting actions there is no consequent bending of the said legs of loops 24 and 36 at the juncture with the feet—instead, there is a turning action in the feet themselves. In other words, looking at Fig. 4, if the guide 32 is accidentally or purposely twisted about the axis of the rod 10, the stretches 44 and 50 tend to rotate on their axes and such rotation is resisted by the stretches 46 and 52 respectively without tearing loose the wrappings 58.

Still further, the guides may be crushed in a manner to move the eyes toward the rods 10 or the guides may be twisted to move the axes of the eyes out of parallelism with the rod 10 and, as soon as such attempted mutilation is released, the guides will spring back to their original shape and position.

The close juxtaposition of the legs of the loops 24 and 36 at the small ends of such loops, and the placing of the loops within the same planes as the eyes, is still another important feature. It is noteworthy that the guides occupy but a small part of the length of the rod 10, thereby virtually eliminating any deterrent to the initial flexibility of the rod 10. In other words, in conventional structures it is common practice to spread the feet of the guides a considerable distance and within such space, the rod is held against flexure, all of which is detrimental to proper and desired use of the fishing equipment.

Still another factor in the improved guide of the instant invention which eliminates any adverse action or "feel" in normal use of the rod, is the lightweight characteristic of the guide itself. Those skilled in this field are well aware of the fact that the weight of a plurality of guides, though small of itself, does have a very direct bearing upon the maneuverability of the rod. The total weight of all of the guides shown mounted on the rod 10 is so very small in the instant invention that the fisherman may place the same in use to the fullest advantage without noticing or feeling the weight of the guides 14 and 32. This weight factor is particularly true at the tip end of the rod 10 and the unusual characteristics of the guides 14 and 32 make it possible to attain all of the aforementioned advantages, while at the same time decreasing the overall weight.

While the guides 14 and 32 are particularly adapted for permitting the use of but a single eye 16 and 34 respectively, it is to be appreciated that, under some conditions, it may be advisable to utilize a number of convolutions in producing the eyes 16 and 34. And such can be done without appreciably increasing the weight thereof because of the nature of the rather thin, yet strong wire material utilized in producing the guides.

Details of construction may, of course, be changed within the spirit of the invention and it is, therefore, desired to be limited only by the scope of the appended claims.

Having thus described the invention what is claimed as new and desired to be secured by Letters Patent is:

1. A line guide for fishing rods comprising a single, relatively long, thin thread of highly resilient, strong, tough spring wire having an intermediate convolution of a spiral coil extending into a pair of legs having juxtaposed ends spaced from the coil; and a foot on each of said ends respectively projecting laterally in opposite directions.

2. A line guide for fishing rods comprising a single, relatively long, thin thread of highly resilient, strong, tough spring wire capable of recovering its original shape after being distorted and having an ovoidal loop, a spiral coil at one end of the loop and substantially coplanar therewith, and a pair of feet at the opposite end of the loop projecting laterally in opposite directions.

3. A line guide for fishing rods comprising a single, relative long, thin thread of highly resilient, strong, tough spring wire capable of recovering its original shape after being distorted and having a substantially closed ovoidal loop provided with a large end and a small end, a line-receiving eye at the large end of the loop, and means at the small end of the loop for attaching the same to a rod.

4. A line guide for fishing rods comprising a single, relatively long, thin thread of highly resilient, strong, tough spring wire capable of recovering its original shape after being distorted and having a line-receiving eye extending into a pair of legs disposed substantially within the plane of the eye and having juxtaposed ends; and a foot on each of said ends respectively and projecting laterally in opposite directions from said plane.

5. A line guide as set forth in claim 4 wherein said feet are aligned, substantially parallel to the axis of the eye and perpendicular to the legs.

6. A line guide as set forth in claim 4 wherein said feet each consist of a pair of interconnected stretches.

7. A line guide as set forth in claim 4 wherein each foot has an extension disposed alongside the other foot.

8. A line guide for fishing rods comprising a single, relatively long, thin thread of highly resilient, strong, tough spring wire capable of recovering its original shape after being distorted and having an ovoidal loop provided with a large end and a small end and consisting of a pair of oppositely bowed legs terminating in juxtaposed ends, a line-receiving eye at the large end of the loop consisting of a single, median convolution of a spiral coil and disposed substantially within the plane of the loop, and a pair of aligned feet integral with said ends of the legs and extending in opposite directions in perpendicular relationship to said legs and said plane and substantially parallel with the axis of the eye.

9. A line guide for fishing rods comprising a single, relatively long, thin thread of highly resilient, strong, tough spring wire, capable of recovering its original shape after being distorted and coiled midway between the ends thereof, presenting a line-receiving eye, there being a pair of outwardly bowed legs extending from said eye and terminating in a pair of juxtaposed ends spaced from the eye, presenting an ovoidal loop disposed substantially within the plane of the eye, said ends of the legs each being provided with a foot projecting laterally in opposite directions, each foot consisting of a pair of stretches.

10. A line guide for fishing rods comprising a single, relatively long, thin thread of highly resilient, strong, tough spring wire, capable of recovering its original shape after being distorted and coiled midway between the ends thereof, presenting a line-receiving eye, there being a pair of outwardly-bowed legs extending from said eye and terminating in a pair of juxtaposed ends spaced from the eye, presenting an ovoidal loop disposed substantially within the plane of the eye, said ends of the legs each being provided with a foot projecting laterally in opposite directions, each foot consisting of a pair of stretches, said ends of the single length of wire each extending between one pair of said stretches.

References Cited in the file of this patent

UNITED STATES PATENTS

| 863,606 | Hoerle | Aug. 20, 1907 |
| 1,844,044 | Pflueger | Feb. 9, 1932 |
| 2,398,862 | Sarkisian | Apr. 23, 1946 |
| 2,697,894 | Graham et al. | Dec. 28, 1954 |
| 2,775,054 | Shinbane | Dec. 25, 1956 |

FOREIGN PATENTS

| 598,898 | France | Dec. 28, 1925 |